United States Patent [19]

Polzer

[11] Patent Number: 5,245,480
[45] Date of Patent: Sep. 14, 1993

[54] FOLDABLE VEHICLE OUTSIDE REARVIEW MIRROR HAVING A DETACHABLE CAP

[75] Inventor: Herwig Polzer, Miltenberg, Fed. Rep. of Germany

[73] Assignee: Hohe KG, Collenberg, Fed. Rep. of Germany

[21] Appl. No.: 626,772

[22] Filed: Dec. 13, 1990

[30] Foreign Application Priority Data

Dec. 15, 1989 [DE] Fed. Rep. of Germany ... 8914759[U]

[51] Int. Cl.$^5$ .......................... G02B 7/18; B60R 1/06
[52] U.S. Cl. ................................ 359/841; 359/872; 359/877; 248/479; 248/900
[58] Field of Search ............... 350/604, 631, 632, 637, 350/638, 639; 248/457, 477, 479, 488, 900; 359/841, 872, 873, 877

[56] References Cited

U.S. PATENT DOCUMENTS

| 4,394,066 | 7/1983 | Sharp | 350/632 |
| 4,504,116 | 3/1985 | Sharp | 350/637 |
| 4,548,483 | 10/1985 | Moro et al. | 248/900 |
| 4,764,004 | 8/1988 | Yamada et al. | 359/872 |
| 4,913,543 | 4/1990 | Haba et al. | 359/875 |
| 4,948,242 | 8/1990 | Desmond et al. | 350/637 |

FOREIGN PATENT DOCUMENTS

| 2703639 | 4/1977 | Fed. Rep. of Germany . |
| 2813316 | 4/1979 | Fed. Rep. of Germany . |
| 8236870 | 5/1983 | Fed. Rep. of Germany . |
| 3344539 | 6/1985 | Fed. Rep. of Germany ...... 350/631 |
| 3416656 | 11/1985 | Fed. Rep. of Germany ...... 350/632 |
| 1390202 | 1/1965 | France ................................ 350/631 |
| 2501600 | 9/1982 | France . |
| 60-244639 | 12/1985 | Japan .................................. 359/877 |
| 0057352 | 3/1988 | Japan .................................. 350/632 |

*Primary Examiner*—Bruce Y. Arnold
*Assistant Examiner*—R. D. Shafer
*Attorney, Agent, or Firm*—Jacobson, Price, Holman & Stern

[57] ABSTRACT

Disclosed is an outside rearview mirror for a vehicle which has a mirror base adapted to be mounted to a car body, and a mirror housing mounted to a support plate. The support plate is fastened foldably to the mirror base by a joint. The mirror housing has the form of a frame surrounding a mirror glass which is mounted by an adjustment device to the rearward face of the support plate. A cap is detachably clamped to the front face of the support plate and continues the outer contour of the mirror housing. Thereby the transfer of vibrations from the mirror housing to the mirror glass is cut down to a minimum and shifted to a frequency range which does not influence the perception of the image the mirror glass is presenting to the driver of the car.

5 Claims, 3 Drawing Sheets

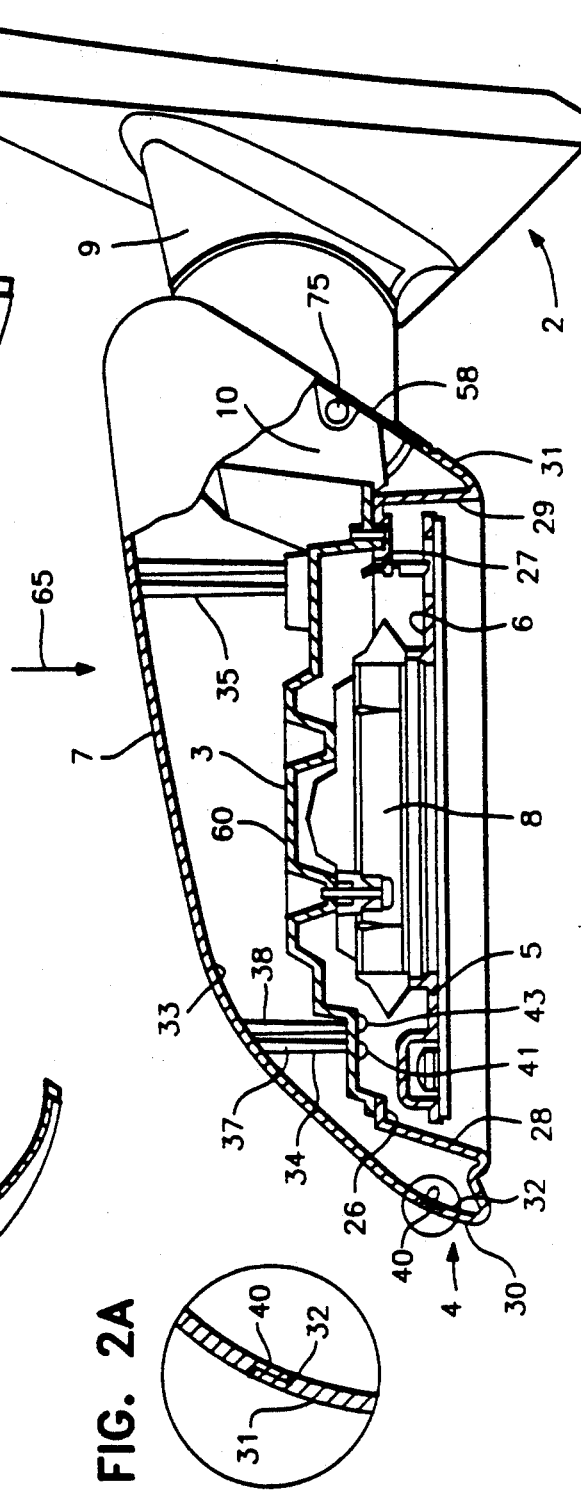
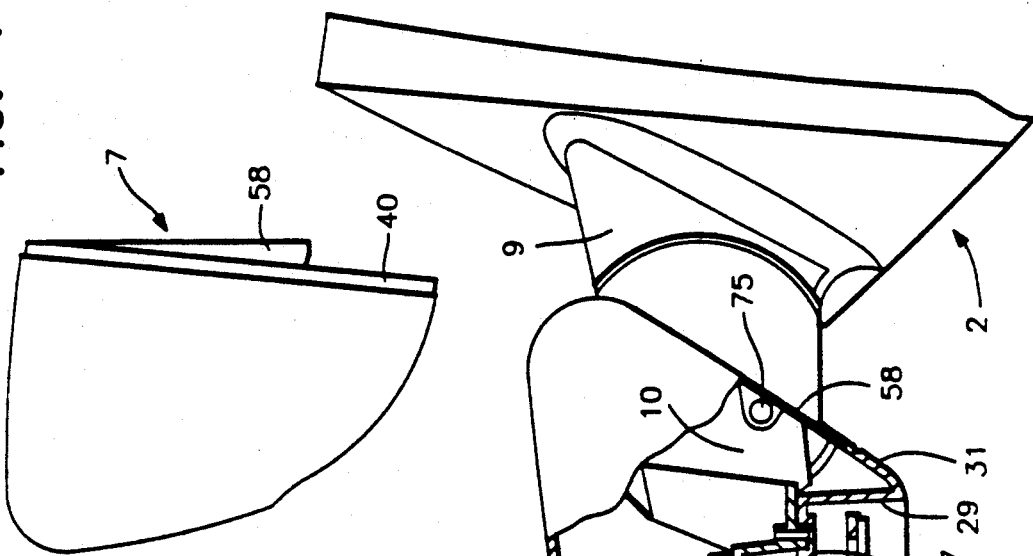
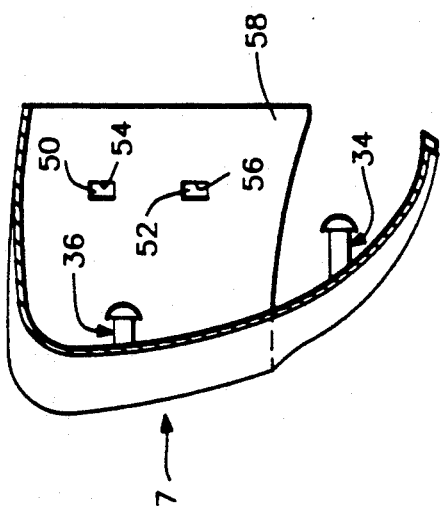

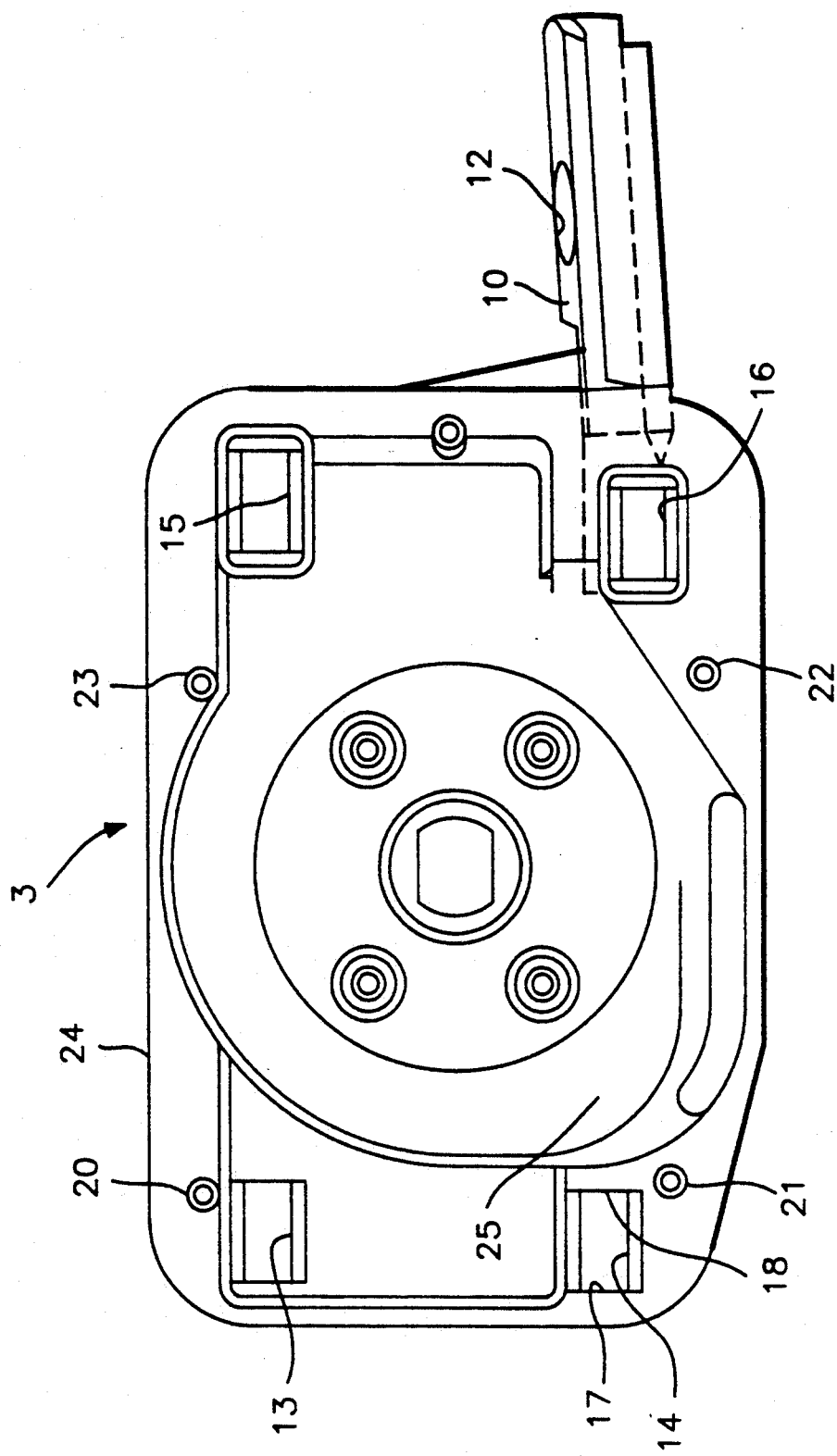

FOLDABLE VEHICLE OUTSIDE REARVIEW MIRROR HAVING A DETACHABLE CAP

BACKGROUND OF THE INVENTION

1. Field of the Invention

The invention refers to an outside rearview mirror for a vehicle, which has a mirror base adapted to be mounted to a car body, and which has a mirror housing foldable about the mirror base.

2. Description of the Related Art

German Utility Model Specification 82 36 870 discloses an outside rearview mirror having a mirror housing to the front portion of which a cap is detachably clamped. The mirror housing may be made of black plastic material whereas the cap may be colored as desired. The cap which has to be clamped strongly to the mirror housing, however, modifies the vibrational characteristic of the unit comprising mirror housing and cap to the effect that under certain conditions vibrations of the car body are transferred to the mirror glass through said unit.

German Patent Specification 28 13 316 discloses an outside rearview mirror wherein a support plate is strongly coupled to a joint connecting foldably the mirror housing to the mirror base. The mirror housing is mounted to the support plate by a number of posts which are spaced for minimizing the transfer of vibrations from the mirror housing to the mirror glass supported by the support plate. If the mirror housing of such an outside rearview mirror is equipped with a detachabled cap, the mirror glass tends to vibrate under special driving conditions of the car.

SUMMARY OF THE INVENTION

It is therefore an object of the invention to devise an outside rearview mirror the mirror glass of which has improved vibrational characteristics over substantially all driving conditions of the car.

According to the invention an outside rearview mirror for a vehicle is provided with a mirror base adapted to be mounted to the car body, and with a mirror housing foldably connected to the mirror base. The mirror housing is mounted to one side of a support plate, and a mirror glass is mounted to the opposite side of the support plate. The mirror housing forms a frame, which leaves free a front portion of the support plate. That portion is covered by a cap which is detachably clamped to the support plate. Thereby a substantial reduction of the mass of the mirror housing is obtained which shifts the natural frequency thereof into a frequency range which has no noticable influence on the perception of the image offered by the mirror glass to the driver of the car. Moreover, vibrations of the cap which are prevented from interacting with those of the mirror housing have a sufficiently high natural frequency and therefore have also no noticable influence on the perception of the image produced by the mirror glass. The invention allows a substantial reduction of the space behind the mirror glass which adds to an improved vibrational characteristic in the low frequency range. Specifically when running the car very fast vibrations of the mirror glass are reduced to an unnoticable minimum.

According to a preferred embodiment of the invention a plurality of radially resilient posts project from the bottom of the cap which may clamp behind edges e.g. of openings formed in the support plate. This allows easy mounting of the cap to the support plate and disengaging of the cap from the support plate in case of repair or replacement. Preferably, the cap may additionally be coupled to a portion of the mirror housing which does not undergo any substantial vibrations and which is normally adjacent the mirror base. To this end it is preferred that one or more elastic fingers are formed from that portion of the mirror housing which may clamp behind shoulders or edges of the cap.

It is specifically preferred to couple foldably an extension of the support plate to the mirror base by a joint. The frame of the mirror housing then may be provided with a continuous web by which the frame is fastened to the support plate.

BRIEF DESCRIPTION OF THE DRAWING

The invention is described in detail hereinafter with reference to the embodiments as illustrated in the accompanying drawings which show:

FIG. 2: a plan view upon the outside rearview mirror according to FIG. 1 of which portions are removed;

FIG. 2a: an enlarged view of FIG. 2 showing the interconnection between the cap and the mirror housing.

FIG. 3: a rearward view of a support plate;

FIG. 4: a lateral view of the cap according to FIG. 3;

FIG. 5: a section through the cap along the line III—III in FIG. 1.

DESCRIPTION OF THE PREFERRED EMBODIMENT

Figure 1:
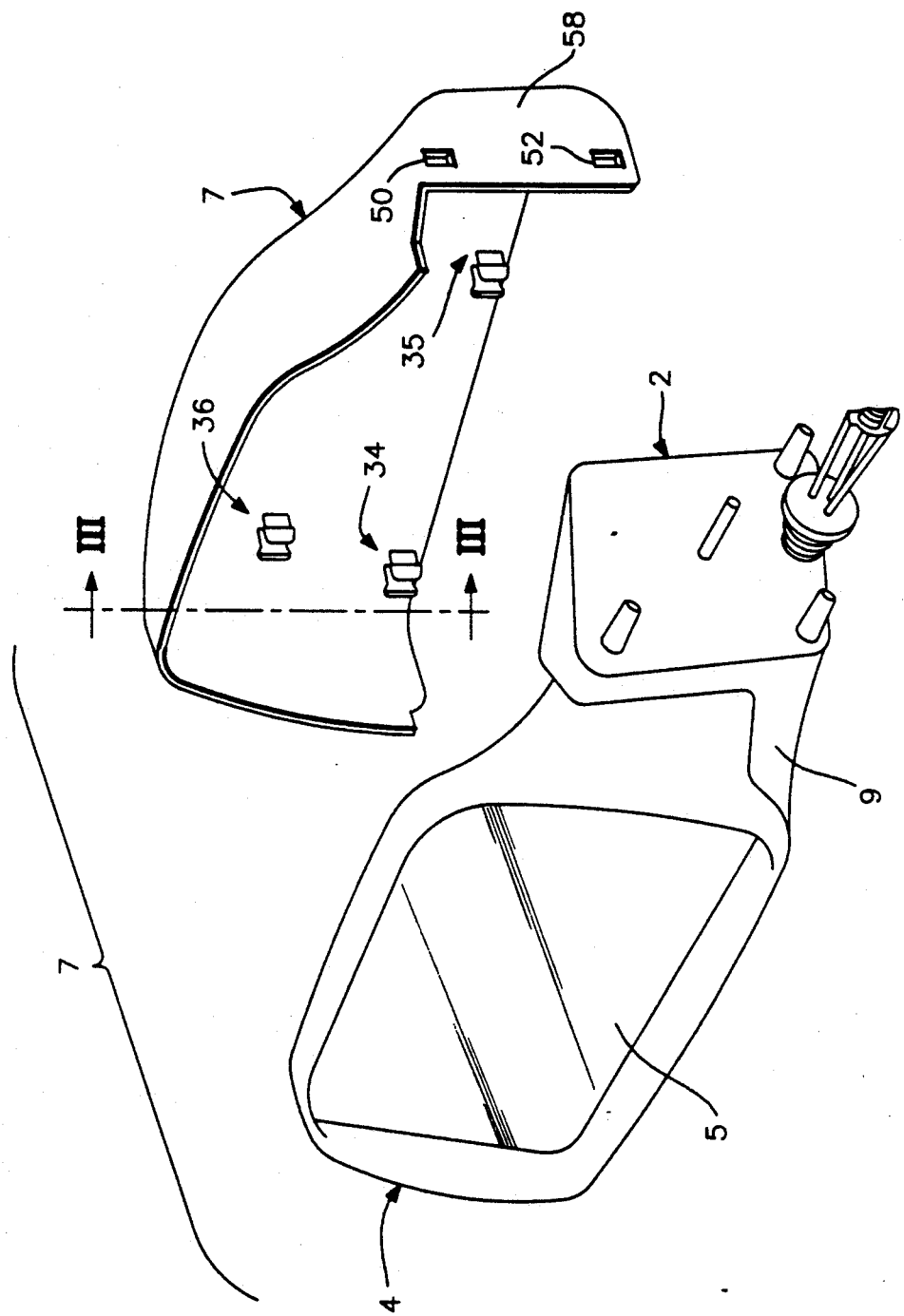
FIG. 1: an exploded schematically view of a left-hand outside rearview mirror for a car as approximately seen by the driver, a cap being detached from the mirror.

The outside rearview mirror designated generally by the reference numeral 1 includes a mirror base 2 adapted to be mounted to the left driver door of a car. An arm 9 projects from the mirror base 2 upon which an extension 10 of support plate 3 is mounted foldably by a tubular rivet according to German Patent Specification 28 13 316 the contents of which is included herein by reference. Thus, the support plate 3 is foldable about a substantially vertical axis of the tubular rivet 75 relative to the mirror base when the latter is mounted to the car body. A mirror glass 5 is bonded to carrier plate 6 which is mounted to a rearward face of the support plate 3 by an adjusting device 8 for adjusting the angular position of the mirror glass 5 within a mirror housing 4. Both the mirror housing 4 and a cap 7 are mounted to the support plate 3. The cap 7 fits into an outcut of the mirror housing 4 and covers a front portion of the support plate 3 which otherwise would be free accessible from the front side through the outcut.

The support plate 3 is made of metal and has a generally rectangular form and is strengthened by beads or similar impressions. The armlike extension 10 protects laterally from a lower portion of the support plate 3 and has a through bore 12 through which the tubular rivet may extend for mounting foldably the support plate 3 to the arm 9 of the mirror base 2. Four rectangular openings 13, 14, 15, 16 are provided in the support plate 3, each opening being arranged in the vicinity of one of the rounded corners of the support plate 3. Each opening 13 . . . 16 has two opposite edges like 17 and 18 which are strengthened for holding noses at free ends of one of radially elastic posts. The support plate 3 moreover has four threaded bores 20, 21, 22, 23 close to its periphery 24. The openings 13, 14, 15, 16 and the threaded bores 20, 21, 22, 23 are aranged around a central portion 25 of the support plate 3 upon which the adjusting device 8 bearing the mirror glass 5 may be mounted.

The mirror housing 4 is formed from shock resistant plastic material and comprises a continuous web 26, 27 surrounding a central opening. The web 26, 27 is provided with four through bores which are arranged in relation to the threaded bores 20, 21, 22, 23. Thereby the mirror housing 4 may be mounted to the support plate 3 by four screws each extending through one of said openings and engaging into one of the threaded bores. The web 26, 27 is formed from a continuous wall section 28, 29 of the mirror housing 4 which surrounds the mirror glass 5 in spaced relationship when the mirror housing 4 and the mirror glass 5 each are mounted to the support plate 3. The wall section 28, 29 is bent forwardly for forming a marginal enlargement 30, 31 the free edge of which is diminished for forming a shoulder 32. As may be seen from FIG. 2 the free edge of the enlargement is substantially flush to the plane of the mirror glass 5 when the mirror glass 5 assumes an intermediate position of its angular range of adjustment. Thereby, the complete front face 60 of the support plate 3 is free accessable from a direction as shown by arrow 65.

The cap 7 may be formed from the same material as the mirror housing and coninues the latter for forming a continuous outer surface of the outside rearview mirror of a common shape. Four radially resilient posts project from the bottom surface 33 of cap 7. Only the posts 34, 35, 36 are shown in FIGS. 2 and 5. The posts are arranged in the bottom surface 33 so as to conform with the positions of the openings 13, 14, 15, 16 of the support plate 3. Each of the posts comprises a pair of resilient, parallel and closely spaced fingers like fingers 37, 38 of post 34. The free end of each finger 37, 38 is formed to a catch nose 41, 43 such that each one of the noses 41, 43 may clamp behind the related edge of the openings 13, 14, 15, 16 like opposite edges 17, 18 of opening 14 for clamping the cap 7 to the support plate 3. Moreover, cap 7 has a continuous inwardly offset marginal web 40 which engages below the diminished marginal web of the mirror housing 4 at shoulder 32 when cap 7 is clamped to the support plate 3. As may be seen from FIG. 2 the posts such as posts 34 and 35 are of different lengths for spanning the space between the bulged form of the cap 7 and the stepped form of support plate 3.

Another pair of spaced, elastic fingers (not shown) is formed from that portion 31 of the marginal enlargement which is adjacent to the mirror base. Each finger has a laterally protecting nose at its free end. A wall section 58 of cap 7 adjacent to the mirror base is provided with two edges 54, 56 as parts of openings 50, 52. Therefore, the noses of the spaced fingers may snap behind edges 54, 56 for additionally mounting and holding cap 7.

For assembling the outside rearview mirror according to the invention the cap 7 is clamped to the front side of support plate 3 when the laterally extending noses of the posts penetrate and snap behind the openings 13, 14, 15, 16. When the cap 7 is so clamped the marginal web 40 engages the margin of the mirror housing 4 so that the form of cap 7 continues the form of the rudimentary mirror housing 4. When clamping cap 7 to support plate 3, the spaced fingers lock resiliently behind edges 54, 56. If repair or replacement of the cap 7 is desired, it may be detached from support plate 3 by bending each pair of fingers 37, 38 towards one another, so that noses 41, 43 are released from the edges 17 and 18 of openings 13, 14, 15, 16 and the cap may be removed thereby disengaging the spaced fingers from edges 54 and 56.

The support plate 3 is vibration-free mounted to the mirror base 2 and suppresses any vibrations in view of its beads and impressions. The extension of the support plate 3 corresponds approximately to that one of the mirror glass 5. Thus, the mirror housing 4 is only a kind of bordering for the mirror glass 5. The expanding arbors are arranged in areas where vibrations nodes or at least reduced vibration amplitudes of the cap 7 are found. Thereby, any vibrations of the cap 7 will not influence the perception of the image the mirror glass is presenting to the driver of the car.

As an option, the cap may be coloured differently than the mirror housing.

What is claimed is:

1. An outside rearview mirror for a vehicle, said outside rearview mirror comprising
   a mirror base for mounting to a vehicle body,
   a mirror housing,
   a mirror glass, said mirror housing forming a frame laterally surrounding said mirror glass,
   a support plate having a laterally projecting extension, said extension being directly and pivotally connected to said mirror base, said mirror housing being mounted on a rear face of said support plate, and
   said mirror glass being adjustably mounted on said rear face of said support plate,
   a cap detachably clamped to a front face of the support plate, the cap fitting into engagement with the mirror housing and forming a portion of a continuing outer contour with the mirror housing, and said cap covering a front face of the support plate.

2. Outside rearview mirror according to claim 1, wherein a plurality of resilient posts project from a bottom of the cap for clamping the support plate.

3. Outside rearview mirror according to claim 2, wherein each post comprises a pair of elastic fingers, a free end of each finger including a catch nose.

4. Outside rearview mirror according to claim 1, wherein the mirror housing has an inner continuous web mounted to the support plate.

5. An outside rearview mirror for a vehicle, said outside rearview mirror comprising
   a mirror base for mounting to a vehicle body,
   a mirror housing,
   a mirror glass, said mirror housing forming a frame laterally surrounding said mirror glass,
   a support plate having a laterally projecting extension, said extension being directly and pivotally connected to said mirror base, said mirror housing being mounted on a rear face of said support plate,
   said mirror glass being adjustably mounted on said rear face of said support plate,
   a cap detachably clamped to a front face of the support plate, the cap fitting into engagement with the mirror housing and forming a portion of a continuing contour with the mirror housing, and said cap covering a front face of the support plate,
   a plurality of resilient posts projecting from a bottom of the cap for clamping the support plate,
   each post including a pair of elastic fingers, and
   a free end of each finger including a catch nose.

* * * * *